United States Patent [19]

Yamamoto

[11] Patent Number: 4,572,063

[45] Date of Patent: Feb. 25, 1986

[54] VIBRATORY GRAIN SEPARATING APPARATUS

[76] Inventor: Shoichi Yamamoto, 813-17 Oaza Tendou Kow, Tendou-Shi, Yamagata-Ken, Japan

[21] Appl. No.: 695,628

[22] Filed: Jan. 28, 1985

Related U.S. Application Data

[62] Division of Ser. No. 522,093, Aug. 11, 1983.

[30] Foreign Application Priority Data

Dec. 2, 1982 [JP] Japan ............................ 57-211781
May 14, 1983 [JP] Japan ............................ 58-84754

[51] Int. Cl.$^4$ ............................ A23N 5/00; B02B 3/00

[52] U.S. Cl. ............................ 99/524; 99/528; 99/601; 99/609; 99/618; 99/621

[58] Field of Search ............................ 99/518-522, 99/524-526, 528, 600-623, 626; 241/6, 7, 9-11, 80; 426/481-483

[56] References Cited

U.S. PATENT DOCUMENTS

| | | | |
|---|---|---|---|
| 3,857,333 | 12/1974 | Satake | 99/609 X |
| 3,952,645 | 4/1976 | Satake | 99/601 X |
| 4,357,864 | 11/1982 | Salete-Garces | 99/609 X |
| 4,441,412 | 4/1984 | Imamura et al. | 99/601 X |

*Primary Examiner*—Timothy F. Simone
*Attorney, Agent, or Firm*—Shlesinger, Fitzsimmons, Shlesinger

[57] ABSTRACT

A vertically disposed unhulled rice lifter is mounted adjacent a stationary frame with its upper end secured against movement relative to and in communication with a hulling section which is secured on the frame above and to one side of a vibratory separating section of the apparatus. Grain from the lifter is hulled between a pair of hulling rolls in the hulling section and is fed downwardly through an air stream on to a vibrating surface on the vibratory separating section. The air stream conveys away hulls and dust from the hulled rice; and the vibrating surface separates the hulled rice grains from any unhulled rice which may have passed through the hulling section. The unhulled portion of grain is then returned to the lifter and the completely hulled grains are conveyed to a storage section.

4 Claims, 18 Drawing Figures

FIG. 1 「PRIOR ART」
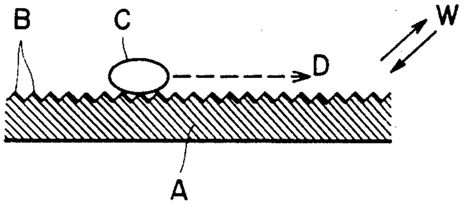
FIG. 2 「PRIOR ART」
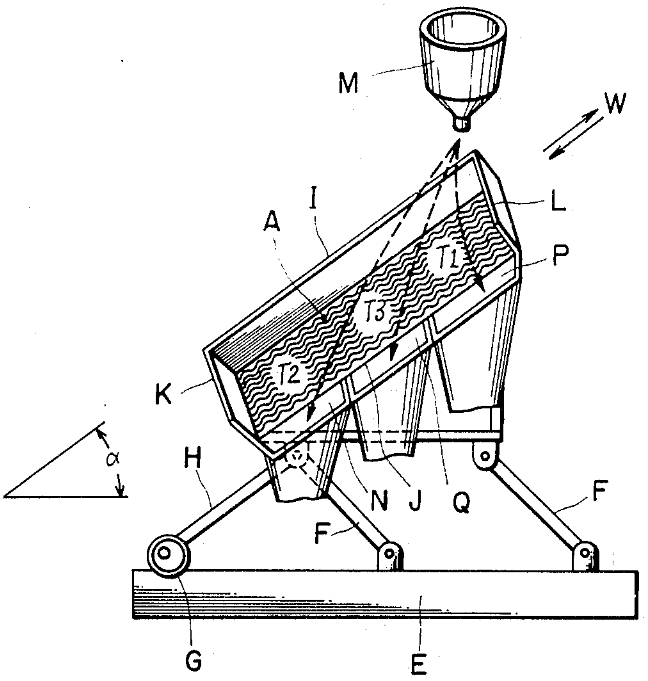

VIBRATORY GRAIN SEPARATING APPARATUS

This application is a division of my pending U.S. application Ser. No. 522,093, filed Aug. 11, 1983 for *Vibratory Grain Separating Apparatus,* Etc.

DETAILED DESCRIPTION OF THE INVENTION

This invention relates to a vibratory grain separating apparatus used with a rice-hulling apparatus for separating these hulled and unhulled rice from a mixture thereof.

An object of the present invention is to permit separation of the unhulled and hulled rice directly from the process grain emerging from the rice-hulling apparatus without leaving the half-hulled rice.

Another object of the present invention is to provide a rice-hulling apparatus, in which the vibratory grain separating apparatus noted is integrally assembled.

A further object of the present invention is to minimize the size of the vibratory grain separating apparatus.

Harvested unhulled rice is hulled by a rice-hulling apparatus to obtain hulled rice, which is then cleaned by a cleaning apparatus. When the hulling is done by adjusting the rice-hulling apparatus such that 100% hulled rice can be obtained through a single cycle, broken rice is liable to result due to an excessive hulling action. Usually, therefore, the hulling pressure is adjusted 70 to 80% of the supplied unhulled rice, the remaining 20 to 30% of rice being left unhulled.

The rice-hulling apparatus, accordingly, is always provided with a separating apparatus for separating the unhulled and hulled rice.

The prior art separating apparatus separates the supplied mixture grain into unhulled rice, hulled rice and half-hulled rice. The unhulled rice is returned to the rice-hullng apparatus for hulling afresh. The hulled rice is taken out as finished rice, which is usually cleaned subsequently. The half-hulled rice is returned to a supply section of the separating apparatus and re-circulated for separating afresh.

To facilitate the understanding of the present invention, the construction of the prior art separating apparatus having the functions noted above will now be described. Referring to FIGS. 1 and 2, which illustrate the prior art pertaining to the present invention, designated at A is a separating element. Its top surface has a number of protuberances B. The grain C to be separated is put on this separating surface of the element A, and the element A is reciprocated in oblique directions shown by arrows W. The protuberances B offers frictional resistance against the flow of the grain C, so that the grain C is progressively directed in the direction of arrow D.

This well-known separating element A is mounted on a base member E as shown in FIG. 2. More particularly, the separating element A is linked to the top of the base member E by inclined rod links F. The separating element A is also coupled to an excentric cam G by a rod H. When the excentric cam G is rotated, the separating element A is reciprocated in the directions of arrows W via the rod H. The separating element A is a rectangular shape. The grain C is supplied from the side I of one of its opposite elongate transversal edges and is discharged from the side J of the other edge. It has a lower and higher end K and L in the transversal direction normal to the line connecting the supply and discharge sides I and J, and it is inclined by an angle $\alpha$.

Designated at M is a supply hopper. The grain C is supplied from a gap on the supply side I adjacent to the upper side L. The discharge side J is open over the entire width. An unhulled rice outlet N and a hulled rice outlet P are provided on the discharge side J adjacent to the lower and upper sides K and L, respectively. A half-hulled rice outlet Q is provided between the outlets N and P.

Mixture rice consisting of unhulled and hulled rice is supplied from said supply hopper M to this separating element while the excentric cam G is rotated to reciprocate the separating element A in the directions of arrows W, whereby the mixture rice on the separating element A is vibrated. Thus, there takes place a primary separating phenomenon that the mixture rice is separated in vertical directions on the separating surface, with the heavier hulled rice sinking while the unhulled rice rising. The hulled rice gathering in the lower layer touches the element A and experiences an upward thrust. This gives rise to a secondary phenomenon that the hulled rice is deflected to proceed toward the upper end L along an orbit as shown at T1 in FIG. 2 so that it is taken out through a hulled rice outlet P. The unhulled rice which is lighter in weight than the hulled rice floats up and flows over the hulled rice layer toward the lower end. That is, it is deflected to proceed along anorbit T2 toward the lower end K so that it is taken out through an unhulled rice outlet N. Intermediate between the upper and lower ends, half-hulled rice is concentrated as shown at T3 to be taken out through a half-hulled rice outlet Q.

The half-hulled rice must be returned to the separating element A for separating it again. The prior art separating apparatus, therefore, requires a half-hulled rice returning means. If there is a separating apparatus which will never discharge any half-hulled rice, no half-hulled rice returning means is necessary, and the price of the apparatus can be reduced that much.

The present invention is intended in the light of the above, and it will now be described with reference to the accompanying drawings, in which:

FIG. 1 is a fragmentary enlarged-scale sectional view showing a prior art separating apparatus;

FIG. 2 is an elevational view of the prior art separating apparatus;

Figure 3:
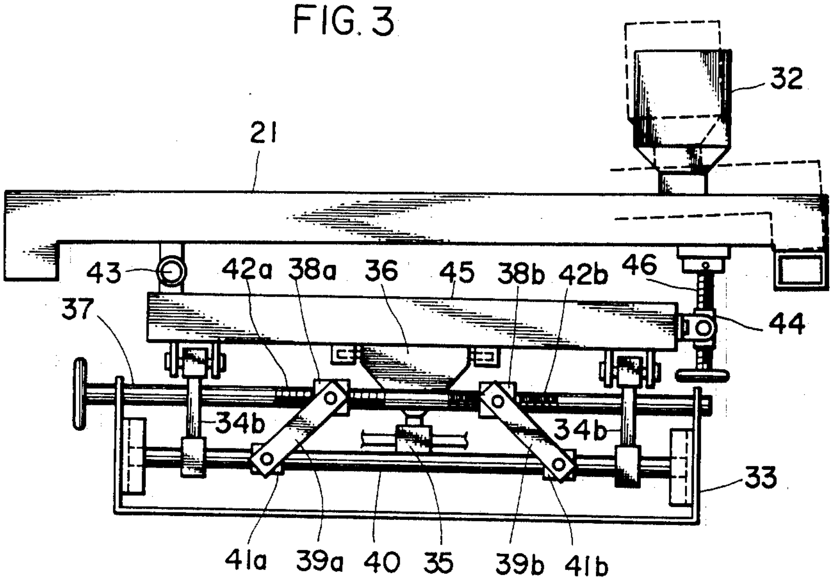
FIG. 3 is a front view showing a separating apparatus according to the present invention.
Figure 4:
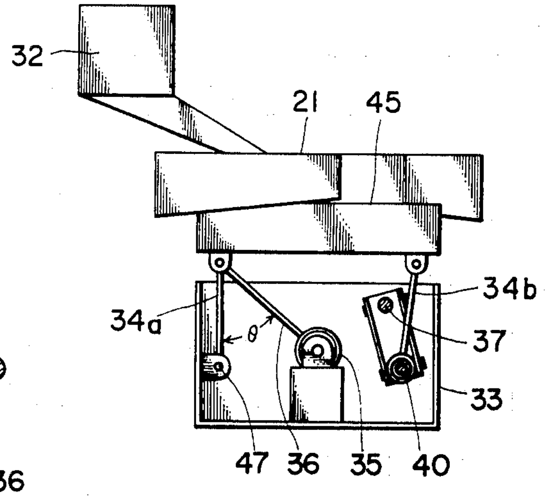
FIG. 4 is a side view of the same.
Figure 7:
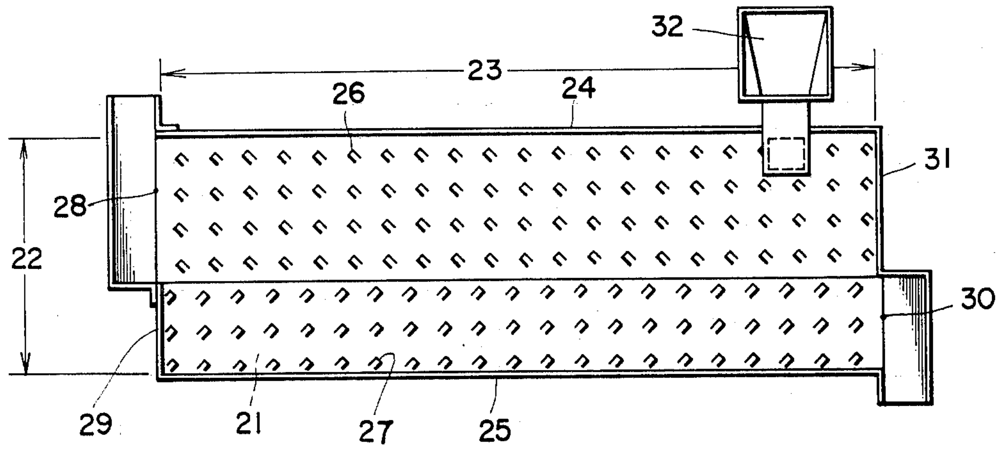
FIG. 7 is a plan view showing the separating element.
Figure 8:
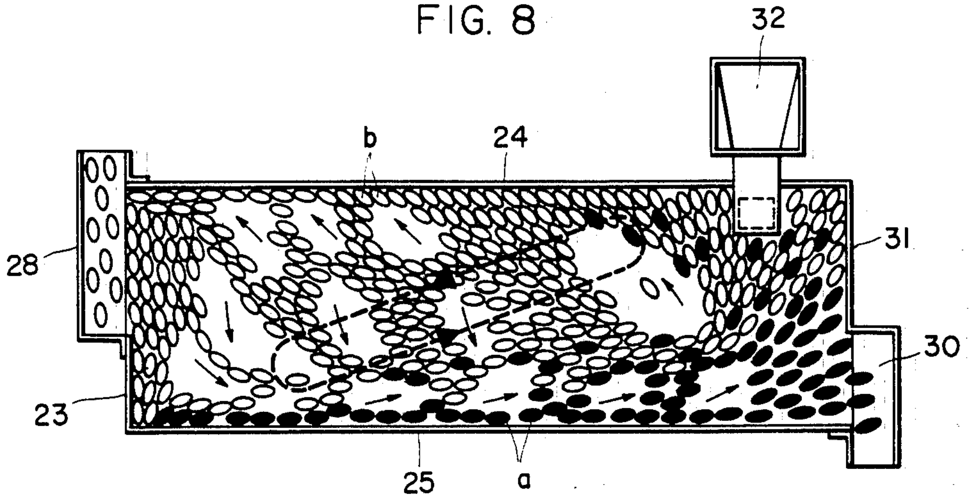
FIG. 8 is a plan view showing the separating element in operation.
Figure 9:
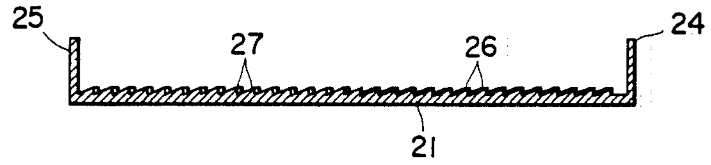
FIG. 9 is a longitudinal cross-sectional view of the separating element.

The vibratory grain separating apparatus according to the present invention will now be described with reference to FIG. 3 and following Figures. Reference numeral 21 designates a separating element. As shown in FIG. 7, its shape is rectangular and elongate in the transversal direction, that is, its dimension 22 normal to the transversal direction is smaller than its transversal dimension 23. It has front and rear upright edge walls 24 and 25 extending over its entire transversal length. Its front portion covering two-third of its surface area has hulled rice moving protuberances 26 inclined toward the left, these protuberances being arranged over the entire front portion. Its rear portion covering one-third of the surface area has unhulled rice moving protuberances 27 inclined to the right, these protuberances being arranged over the entire rear portion. As is clearly seen from the side sectional view of FIG. 9, the protuberances 26 and 27 are inclined upwards toward the front upright edge wall 24.

The separating element 21 has a hulled rice outlet 28 formed on the left side of the front portion, while the rest of the left side is closed by a left side wall 29. It also has an unhulled rice outlet 30 formed on the right side of the rear portion, while the rest of the right side is closed by a right side wall 31.

A supply hopper 32 is found over the front portion of the separating element 21 adjacent to the unhulled rice outlet 30. A base member 45 is coupled by front and rear arms 34*a* and 34*b* to a lower frame 33. Each front arm 34*a* is pivoted at the lower end by a pin 47 to the front wall of the lower frame 33. A rotary shaft 37 adjustable in the transversal direction is rotatably mounted in a rear portion of the lower frame 33. As shown in FIG. 3, the rotary shaft 37 has oppositely cut threads 42*a* and 42*b* formed on the opposite sides of its axial center. Female thread members 38*a* and 38*b* are fitted on the respective threads 42*a* and 42*b*. The lower end of the rear arms 34*b* is mounted on a vertically movable shaft 40 extending beneath and parallel to the rotary shaft 37. Bosses 41*a* and 41*b* are mounted on the vertically movable shaft 40. The female thread member 38*a* and boss 41*a* are coupled together by a rod 39*a*, while the other female thread member 38*b* and boss 41*b* are coupled together by a rod 39*b*. A left side portion of the separating element 21 is linked by a pin 43 to the top of the corresponding portion of the base member 45. The right end of the base member 45 has a female thread member 44, in which a vertical adjusting screw 46 is screwed. The upper end of the adjusting screw 46 is coupled to the bottom of the separating element 21.

Figure 6:
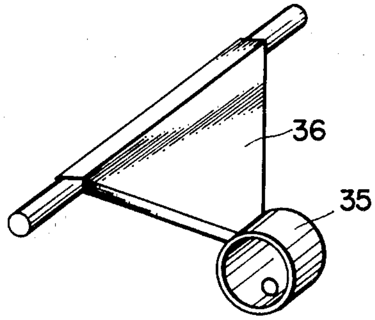
FIG. 6 is a perspective view showing an excentric cam and a rod.
Figure 5:
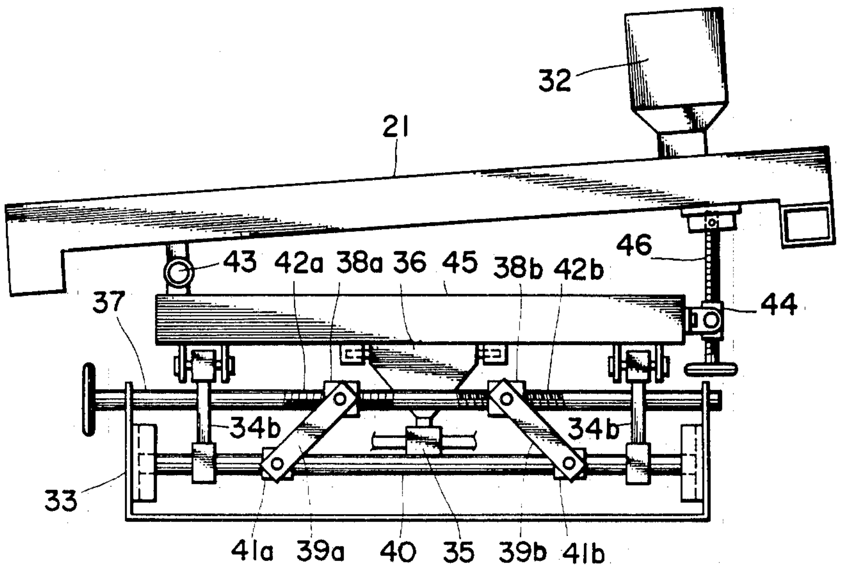
FIG. 5 is a view similar to FIG. 3 but with the transversal inclination angle of a separating element adjusted to a different angle.

Reference numeral 35 designates an excentric cam having a rod 36, which is pivoted at the upper end to the base member 45 near the upper end of arm 34*a*. The angle $\theta$ between the arm 34*a* and rod 36 is smaller than the right angles so that the base member 45 can return quickly. FIG. 6 shows a perspective view of the rod 36. It has an upwardly flaring portion.

Figure 13:
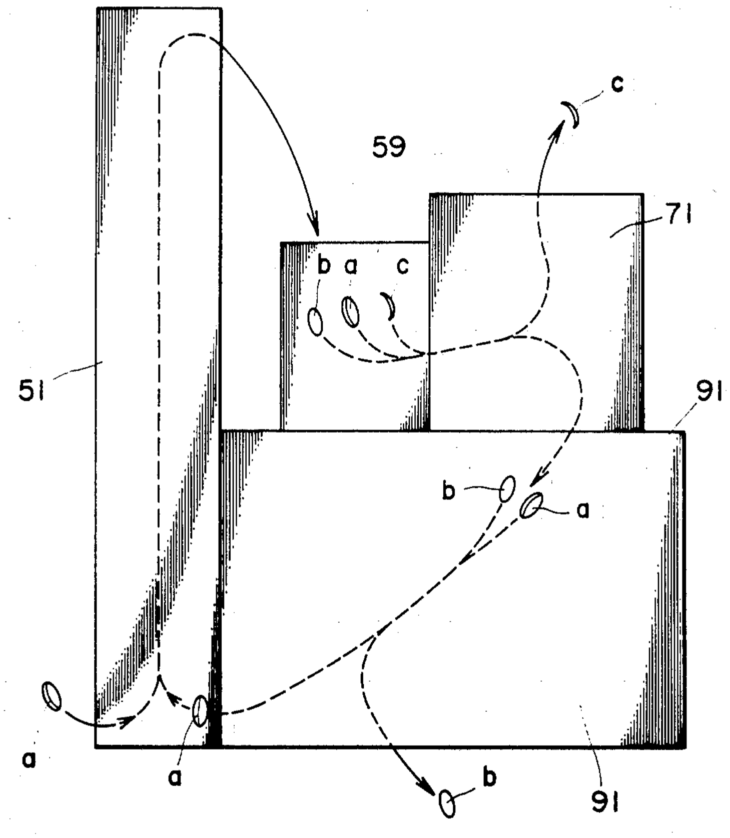
FIG. 13 is a schematic view showing a rice-hulling apparatus incorporating the separating element according to the present invention.

FIG. 13 and following Figures illustrate a rice-hulling apparatus which incorporates the separating apparatus described above. It comprises a lifter 51 including an upper and lower guide roller 52 and 53, round which an endless belt 54 with buckets is passed. The lifter 51 has a side inlet 55 provided at the lower end, and a side hopper 56 is mounted at the side inlet 55. The lifter 51 also has an outlet 57 provided at the top. A stationary hopper 58 is mounted on the outlet 57. The stationary hopper 58 is made of a plastic material. It is possible to fabricate the frame of the lifter 51 and the stationary hopper 58 as a one-piece plastic molding. The stationary hopper 58 is stationary and not vertically moved. It is secured by bolts to the outlet 57. The lower end of the stationary hopper 58 is secured to the top of a frame 60 of the hulling section 59.

The plastic stationary hopper 58 in this arrangement serves to temporarily store grain and also firmly hold the top of the lifter 51. Especially, the latter effect is considerably great. In the prior art rice-hulling apparatus the top of the lifter is very unstable and is vibrated with the vibratory separating apparatus because the vertically movable storage tank is suspended from it. The stationary hopper 58 has an over-flow hole 61 formed at an intermediate position. An on-off valve 62 is provided at the outlet of the stationary hopper 58. The hulling section 59 accommodates a pair of hulling rollers 63 and 64 disposed such that their shafts 65 and 66 lie in an oblique plane. The shafts 65 and 66 extend parallel to the guide rollers 52 and 53. A delivery roller 67 is provided immediately beneath the on-off valve 62. A guide plate 68 is provided beneath the delivery roller 67, such that the grain departing therefrom is directed to between the hulling rollers 63 and 64.

A blower 69 is provided on the frame 60 beneath the guide plate 68. It is transversally elongate and extends substantially over the full width of the apparatus. Air is forced out from the blower 69 through an air passage 70 to be led past the underside of the hulling rollers 63 and 64 into an air-blow separating section 71. A vibratory dispersing member 72 is provided on the discharge side of the hulling rollers 63 and 64 and serves to disperse the process material emerging from between the hulling rollers 63 and 64 in the direction of the width of the apparatus.

A withdrawal blower 73 is mounted on one side wall of the frame of the air-blow separating section 71. Its shaft 74 has an excentric cam 75 having an integral rod 76 which is secured at the other end to the vibratory dispersing member 72.

The lower end of the vibratory dispersing member 72 is biasedly supported by a leaf spring 77, and its outlet 78 is flaring downwards. With the rotation of the excentric cam 75, the outlet 78 is quickly reciprocated in oblique directions, thereby causing the process grain supplied from the hulling section 59 to be dispersed in the transversal directions.

Figure 16:
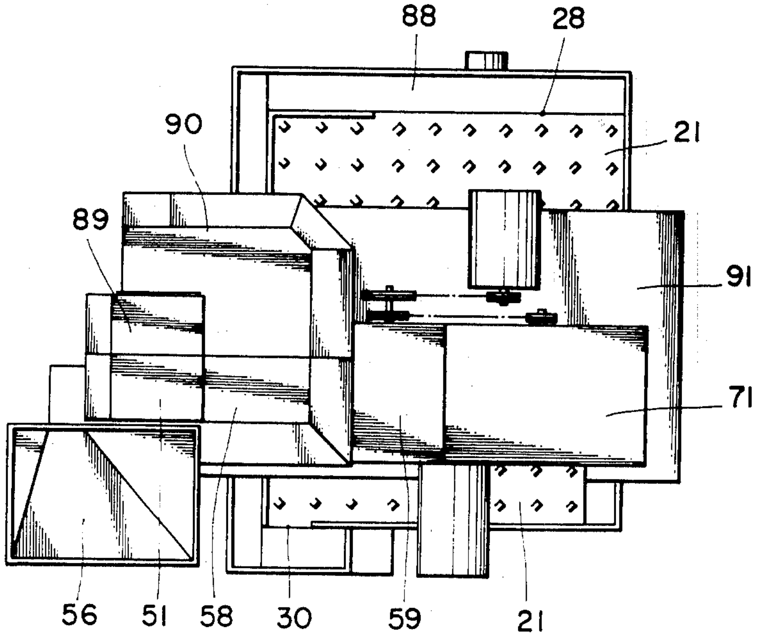
FIG. 16 is a plan view of the same.
Figure 17:
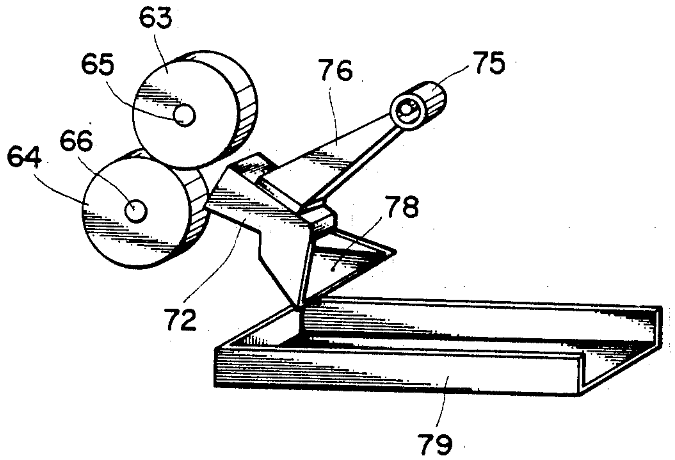
FIG. 17 is a perspective view showing part of the same.
Figure 18:
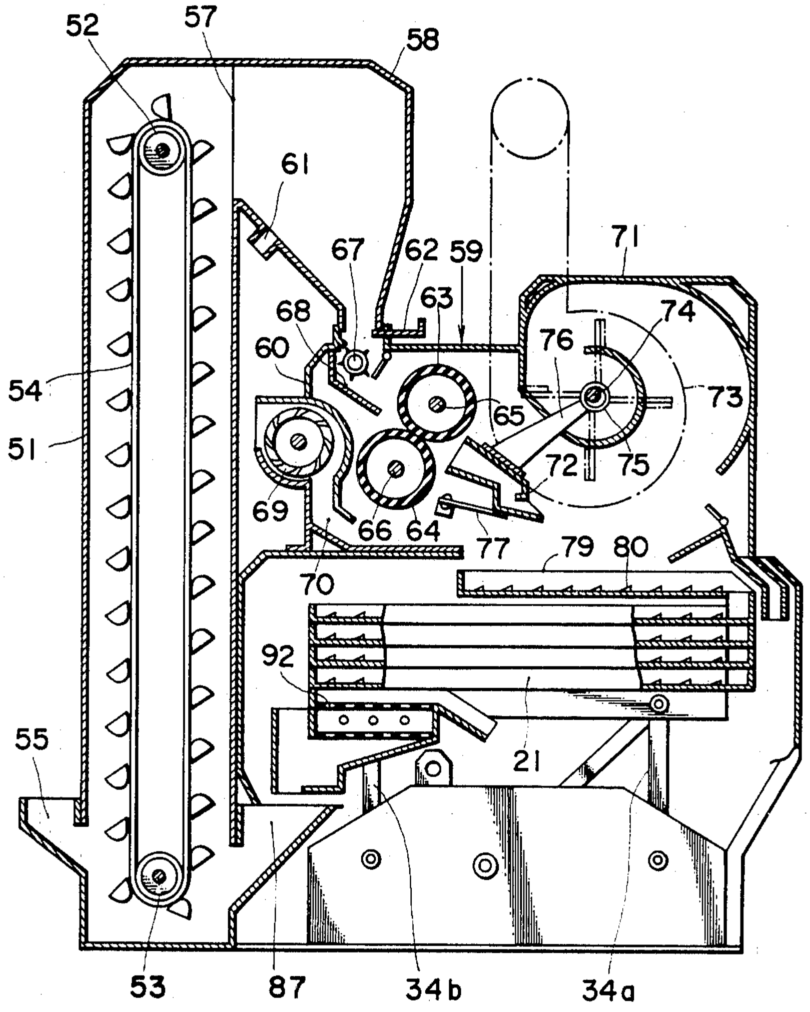
FIG. 18 is a longitudinal cross-sectional view of the same.

A distributing gutter 79 is disposed beneath the outlet 78. The upper surface of its bottom has a number of protuberances 80. It is secured to the top of a multi-element separator consisting of a plurality of separating elements 21 as described above stacked one above another. Reference numeral 87 designates an unhulled rice return inlet, 88 (FIG. 16) a hulled rice gutter, 89 a hulled rice lifter, 90 a hulled rice storage tank, 91 a vibratory separating section, and 92 a filter.

In operation, the unhulled rice a (FIG. 13) supplied to the lifter 51 is lifted to be supplied to the hulling section 59. The hulling section 59 produces a combination (FIGS. 8–12) of unhulled rice a, hulled rice b and hull c. This processed grain is supplied to the air-blow separating section 71 where the hull c is separated by air blown against it. The remaining unhulled and hulled rice a and b is led into the vibratory separating section 91. The separated unhulled rice a is returned to the lifter 51, while the separated hulled rice b is led to the outside of the apparatus.

More specifically, the material unhulled rice a supplied to the side inlet 55 is by belt 54 with buckets through the lifter 51 and discharged through the outlet 57 into the stationary hopper 58 to be stored therein. When the amount of grain stored exceeds a predetermined quantity, it over-flows through the over-flow hole 61 to be returned to the side inlet 55. By opening the on-off valve 62, the grain stored in the stationary hopper 58 is delivered by the delivery roller 67 onto the inclined guide plate 68. The grain falling onto the guide plate 68 flows therelong to be directed therefrom to between the hulling rollers 63 and 64 arranged in an oblique relation to each other. The process grain emerging from between the hulling rollers 63 and 64 enters the vibratory dispersing member 72. Since the shaft 74 of the withdrawal blower 73 is being rotated in unison with the eccentric cam 75 mounted on it, the rod 76 with the upper end thereof secured to the eccentric cam 75 is reciprocated in oblique directions, whereby the vibratory dispersing member 72 secured to the lower end of the rod 76 is reciprocated in oblique directions. While the vibratory dispersing member 72 is reciprocated, it is elastically supported by the leaf spring 77.

The process grain in the vibratory dispersing member 72 thus falls therefrom in a state uniformly dispersed in the width direction into the distributing gutter 79. The blower 69 withdraws air and forces it through the air passage 70. The air issuing from the air passage 70 proceeds past the underside of the vibratory dispersing member 72 and then through the process matter falling from the outlet 78 into an upper space in the air-blow separating section 71. As the air proceeds through the falling process grain, it blows out the hull c which is light in weight. The blown-out hull c is withdrawn by the withdrawal blower 73 to be discharged to the outside of the apparatus.

The resultant mixture rice, now free from the hull c, falls onto the distributing gutter 79 to be distributed therethrough to the individual separating elements 21. Each separating element 21 operates as follows. Since the angle $\theta$ between the arm **34*a* and rod 36 is smaller than the right angles, the separating element 21 is moved quickly in the return stroke, i.e., from the front side to the rear side, and rather slowly in the converse direction with the rotation of the excentric cam 35**, the ratio of the return speed to the forward speed being 1:1.01–1.2.

Figure 10:
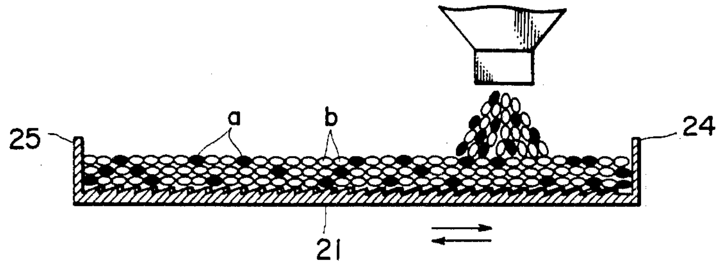
FIGS. 10 through 12 are sectional views illustrating the separating operation of the separating element.
Figure 11:
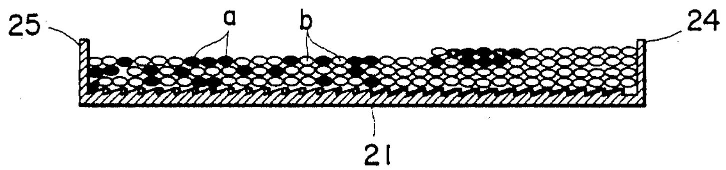
Figure 12:
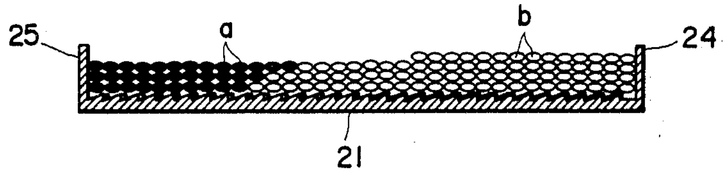
Figure 14:
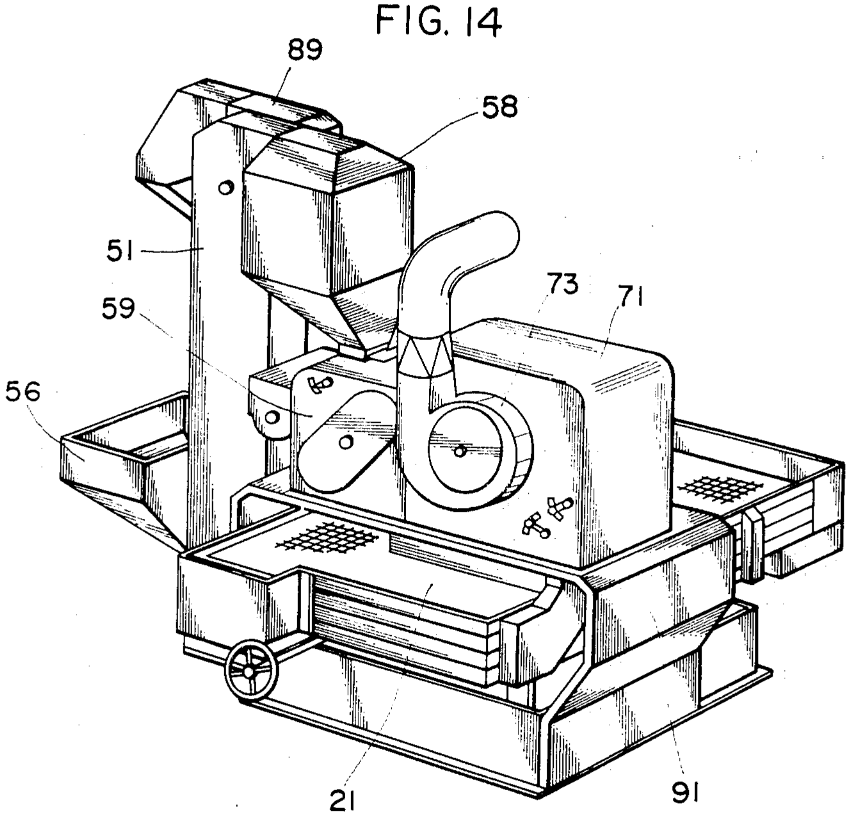
FIG. 14 is a perspective view of the same.
Figure 15:
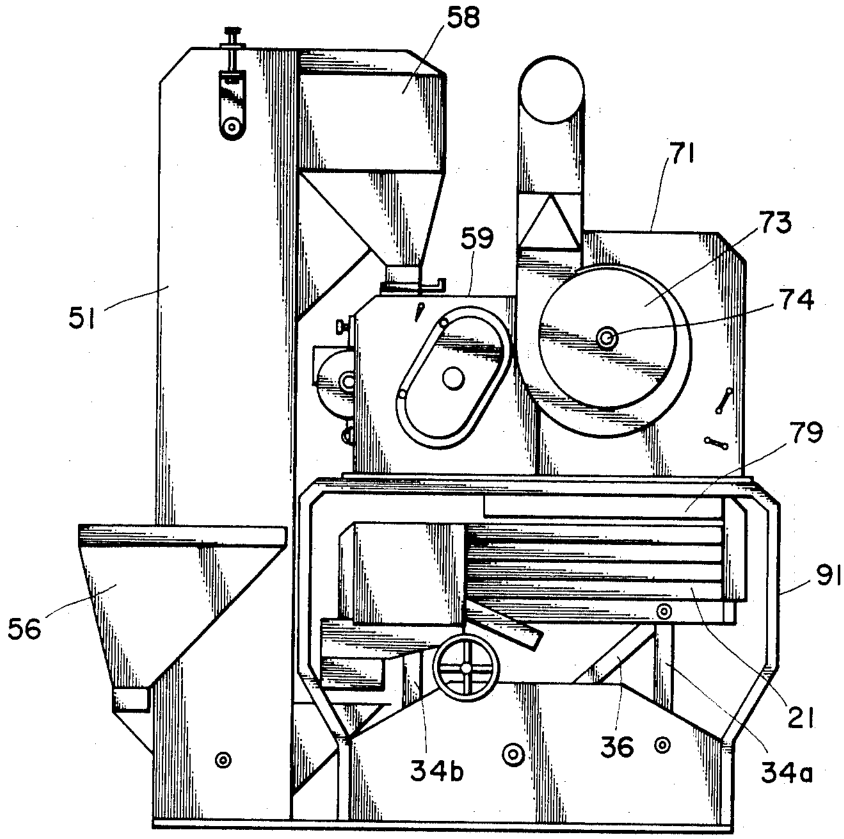
FIG. 15 is a side view of the same.

The mixture rice consisting of the unhulled and hulled rice a and b supplied to the separating element 21 is initially in a state of entirely half-hulled rice as shown in FIG. 10. As it experiences a back-and-forth vibratory motion in horizontal or oblique directions, the primary phenomenon noted previously takes place, with the heavier hulled rice b sinking and the lighter unhulled rice a floating up to form an upper layer. The sinking hulled rice b touches the hulled rice moving protuberances 26 and unhulled rice moving protuberances 27.

The contact of the hulled rice b with the protuberances 26 and 27 gives rise to the secondary phenomenon noted previously. That is, the hulled rice b gradually proceeds toward the front upright edge wall 24 of the separating element 21, so that it forms a comparatively thick layer on the front portion of the separating element 21. On the other hand, its layer formed on the rear portion of the separating element 21 is comparatively thin. With the formation of a difference in the thickness between the front and rear portions of the hulled rice layer on the separating element 21, the unhulled rice a floating up to the surface of the front portion of the hulled rice layer is caused to move thereover toward the rear portion of the separating element 21.

The extent of this secondary phenomenon is adjusted by turning the adjusting shaft 37. By turning the adjusting shaft 37, the female thread members **38*a* and 38*b* screwed on the oppositely cut threads 42*a* and 42*b* are brought toward or away from each other to cause the rods 39*a* and 39*b* be more inclined or more upright. This motion of the rods 39*a* and 39*b* causes a vertical displacement of the vertically movable shaft 40, whereby the back-and-forth inclination of the separating element 21 is adjusted via the rear arms 34*b***.

As the sequence of phenomena described above proceeds, there occurs a tertiary phenomenon that the hulled rice b gathering as a thick layer on the front portion of the separating element 21 turns to be moved to the left along the front upright edge wall 24 by the action of the top of the hulled rice moving protuberances 26. During this leftward movement of hulled rice, the protuberances 26 and 27 continually provide the separating action on the hulled rice b in contact with them. Thus, as the hulled rice layer moves along the front upright edge wall 24, its thickness is progressively increased. Eventually, an upper portion of the hulled rice layer turns to flow toward the rear portion of the separating element 21. This has an effect of increasing the purity of the hulled rice b, so that when the hulled rice layer reaches the hulled rice outlet 28, it completely consists of the hulled rice b. The movement of the hulled rice b toward the hulled rice outlet 28 is chiefly caused by the tip of the hulled rice moving protuberances 26. The hulled rice moving protuberances 26 has a far greater area than that of the unhulled rice moving protuberances 27, so that they can reliably cause movement of the hulled rice b.

The unhulled rice a, meanwhile, slides over the inclined surface of the hulled rice layer toward the rear portion of the separating element 21. On the rear portion of the separating element 21, there takes place a quaternary phenomenon that the unhulled rice a is moved to the right by the action of the unhulled rice moving protuberances 27. While the unhulled rice a is moved to the right over the separating element 21 by the action of the unhulled rice moving protuberances 27, the secondary phenomenon of separating is still in force. The purity of the unhulled rice a thus is progressively increased, so that perfectly unhulled rice is taken out through the unhulled rice outlet 30.

The extents of the tertiary phenomenon, i.e., the movement of the hulled rice a toward the hulled rice outlet 28, and the quaternary phenomenon, i.e., the movement of the unhulled rice b toward the unhulled rice outlet 30, are adjusted by adjusting the transversal inclination of the separating element 21. That is, by turning the adjustment screw 46 the transversal inclination of the separating element 21 is adjusted, and the extents of the tertiary and quaternary phenomena are subtly adjusted according to the extent of the inclination.

During the separating operation described above, half-hulled rice remain revolving on a central portion of the separating element 21. That is, it is never let to the outside of the separating element 21, but only the hulled and unhulled rice b and a are renewed.

The separated unhulled rice a is led through the hulled rice outlet 30 to the filter 92 where large foreign particles are separated, and only the unhulled rice a having passed through the filter is returned to the unhulled rice return inlet 87 and re-circulated together with the newly supplied unhulled rice by the belt 54 with buckets for hulling afresh.

The hulled rice taken out through the hulled rice outlet 28 flows along the hulled rice gutter 88 into the hulled rice gutter 89 where it is lifted to be stored in the hulled rice storage tank 90 and measured and packed in a measuring and packing device provided beneath the tank 90. The packed product rice is transported to a given position.

I claim

1. A grain hulling apparatus comprising a frame, an unhulled rice lifter mounted adjacent to and extending above said frame, a vibratory separating section provided on said frame adjacent one side of said unhulled rice lifter, a single hulling section including a pair of hulling rollers mounted on said frame to rotate about parallel axes above said vibratory separating section and adjacent the side thereof nearest said unhulled rice lifter to receive unhulled rice therefrom, said hulling section being operative to discharge hulled, processed rice onto a vibrating surface of said separating section, and an air-blow separating section provided on said frame adjacent one side of said hulling section, the processed grain discharged from said hulling section being subjected to a stream of air in said air-blow separating section, whereby said air stream separates hulls from the processed grain during passage thereof from said hulling section to said vibratory separating section.

2. A rice-hulling apparatus comprising a frame, an unhulled rice lifter adjacent said frame having an upper end extending above said frame, and having a side hopper provided at the lower end, thereby to receive unhulled rice from a source thereof, a finished rice lifter, a vibratory grain separating section, a single hulling section and an air-blow separating section, said unhulled rice lifter and hulling section being coupled together on said frame such that grain is supplied from said unhulled rice lifter to said hulling section, said hulling section and air-blow separating section being coupled together on said frame such that grain is supplied from said hulling section to said air-blow separating section, said air-blow separating section and vibratory grain separating section being coupled together on said frame such that grain passes through said air-blow separating section to a vibrating surface of said vibratory grain separating section, and said vibrating surface of said vibratory grain separating section and said unhulled and said finished rice lifters, respectively, being coupled together on said frame such that hulled and unhulled grain is supplied from said surface on said vibratory grain separating section to said finished and to said unhulled rice lifters, respectively.

3. The rice-hulling apparatus according to claim 2, wherein said unhulled and finished rice lifters are disposed side by side and in close contact with each other.

4. The rice-hulling apparatus according to claim 2, which further comprises a finished rice storage tank mounted on top of said finished rice lifter.

* * * * *